Patented Aug. 28, 1951

2,566,066

UNITED STATES PATENT OFFICE 2,566,066

METHOD OF PREPARING A HYDROCHLORIDE OF A SULFA DRUG COMPOSITION FOR POULTRY

Irving W. Martin, Sibley, Iowa

No Drawing. Application October 11, 1948,
Serial No. 53,985

1 Claim. (Cl. 167—51.5)

The present invention relates to an improved therapeutic composition and a method of preparing it for administration to poultry for the treatment of bacterial infections in such poultry. More specifically, the invention relates to an improved method of preparing a therapeutic composition for treating bacterial infections in poultry comprising water soluble derivatives of sulfa drugs and particularly the water-soluble derivatives of water-insoluble sulfa drugs such as the amines or amides. The invention relates further to an improved method of preparing therapeutic compositions of the water-soluble sulfa derivatives of sulfa drugs by incorporating one or more of them in the drinking water fed to infected livestock.

Among the water-insoluble sulfa drugs included within the scope of the present invention are sulfanylil guanidine mono hydrate, para aminobenzene sulfonamide (sulfanilamide), sulfamethazine, sulfaguanadine, sulfapyradine, sulfadiazine, sulfamerazine, sulfapyrazine, sulfaquinoxaline, and sulfathiazole. The water-soluble derivatives of the foregoing sulfa drugs are particularly useful in combating poultry diseases in the following catgories: Coccidiosis in chickens; colds or coryza in chickens; pullorum infections of baby chicks. The basic ingredient used for pulmonary conditions is sulfathiazole solution and on intestinal conditions, sulfaguanadine.

The present application is a continuation-in-part of applicant's copending application Serial No. 617,923, filed September 21, 1945, now abandoned.

Heretofore sulfa drugs of the type indicated above have usually been administrated in admixture with the food or drink of poultry for the purpose of treating bacterial infections in individual fowl in the flock as a whole. It often happens, however, that infected fowl will not readily be induced to eat food of any kind, wherefore the fowl will not consume a sufficient quantity of the drug to build up the therapeutically correct minimum concentration in the body of the fowl to combat the disease. Clinical tests show, for example, that the blood levels of sulfa drugs in fowl fed on a diet including water-insoluble sulfa drugs is far below that obtained by the teachings of the present invention and in fact is usually not sufficient to provide the minimum required blood levels for combating the disease.

Even if the fowl attempts to eat the food or drink the liquid to which a sulfa drug has been added (even when thoroughly mixed with the food or liquid) a considerable part of the drug is left uneaten by the fowl and hence will be wasted, or if eaten by other animals may infect them with the disease.

In accordance with the present invention, a therapeutic composition which is effective for treatment of bacterial infections in livestock is provided by converting a sulfa drug of the type mentioned into a water-soluble derivative thereof. It has been found that the halogen derivatives are particularly useful for the purposes of the present invention, particularly in the form of the hydrochloride of the drug. It is found that a measured quantity of the hydrochloride solution of a sulfa drug mixed with a measured quantity of the drinking water to be consumed by the livestock will successfully combat most infections common to livestock, and is particularly effective in combating poultry diseases.

It is found that while infected poultry often will not eat any food, they will usually consume some water, but it is found that water treated with a hydrochloride of a sulfa drug in accordance with the present invention will be more readily consumed by infected poultry than is water treated with insoluble sulfa drugs or untreated water. This facilitates the administration of the derivatives of the present invention in addition to the fact that it apparently provides a therapeutically correct concentration of the derivative in a more readily assimilable form. Moreover, it is found that it is possible to accurately control and measure out the proper dosage by adding it to a measured quantity of the drinking water of the poultry and thereby make it possible to administer dosages of the proper strength to combat the disease with which the poultry is infected.

An unforeseen advantage of using the hydrochlorides of sulfa drugs is that recovery of the poultry from infection is more rapid than when treated with either the water-insoluble sulfa drugs or the water-soluble forms other than the water-soluble halogen derivatives. The more rapid recovery of the livestock is believed to be attributed to the fact that it is possible to attain the therapeutically correct blood levels to combat the disease more quickly with the hydrochloride of the sulfa drugs than with the drugs alone or with any other derivatives thereof.

It is also found that the hydrochlorides of the sulfa drugs are perfectly safe for use on all livestock inasmuch as the hydrochlorides do not manifest a toxic effect when administrated in accordance with the teachings of the present invention. This is in contrast with a number of sulfa drugs in the unconverted form and even with sodium salts of some of the sulfa drugs. In addition to clinical tests on poultry, further tests on a wide variety of other livestock, including swine, no livestock has been found to produce any toxic symptoms when treated with the hydrochloride form of sulfa drugs.

The hydrochloride of various sulfa drugs may be prepared in accordance with the following examples, which are given by way of illustration:

*Example 1.*—15 grams of sulfanylil guanadine is added to 450 cc. of water and the mixture is stirred to produce a suspension of the water-insoluble sulfa drug. Next there is slowly added 15 cc. of 12 N (about 37 percent) hydrochloric acid while stirring the mixture. The hydrochloric acid reacts with the sulfa drug to convert it into the water-soluble hydrochloride, giving a solution of the derivative of about 3.13 percent strength in hydrochloric acid solution of about 3 percent strength.

A small quantity of this solution, say 2 tablespoonfuls (one fluid ounce) is added to one gallon of drinking water which is then fed to the infected animals. It is found that the solution, being acidic, will not neutralize the natural stomach acids of the livestock, but rather is compatible therewith, and is more effective in combating the disease with which the livestock is infected.

*Example 2.*—A water-soluble hydrochloride of infected poultry. The present invention provides a therapeutic composition in the form of the water-soluble hydrochloride of the sulfa drugs which assures a blood sulfa level well above the therapeutically correct minimum. By way of example, it has been found that even with 64 grains of the water-soluble sodium salt of sulfathiazole per gallon of water fed to infected livestock it was not possible to even attain a blood level of 5 milligrams per hundred milliliters of blood. With only 22.5 grains of the hydrochloride of sulfathiazole in each gallon of water a blood level of 6.39 milligrams per hundred milliliters is obtained. Translating the saving in therapeutic agent into monetary terms, it is found that the cost of medicating 100 chickens, 24 weeks of age, for infectious coryza with the hydrochloride of sulfa in the driking water was 47 cents per day as compared to 77 cents per day with the insoluble sulfa powder, the figures being based on prevailing retail prices of the respective agents. The economic value of each animal is often so small, as in the case of poultry, as to preclude the administration of expensive medication to combat the disease. The present invention, however, provides the necessary therapeutic blood levels with as little as ¼ the quantity of drug heretofore required for treatment. Even greater savings in the amount of sulfa drug required may be obtained by using the hydrochloride of sulfamethazine, this derivative having shown a capability of building up a very high blood sulfa level in a very short period of time with a smaller concentration than most of the other derivatives.

The following table indicates the blood levels obtained by administering sulfathiazole to a representative group of chickens under controlled conditions:

*Blood sulfa levels obtained by administering sulfathiazole in liquid and powder form in feed*

| Group No. | Average Weight Per Bird | Sulfathiazole Dosage | Average Sulfa Consumption Per Bird a Day | Blood Sulfathiazole Levels |
|---|---|---|---|---|
| | *Gms.* | | *Mg.* | *Mg./100 ml.* |
| I | 820 | 16 grains water-soluble sulfa in 1 gallon drinking water | 129.6 | 4.00 |
| II | 1,168 | 32 grains water-soluble sulfa in 1 gallon drinking water | 259.2 | 10.00 |
| III | 1,195 | 0.5% in feed (powdered water-insoluble sulfathiazole) | 420.0 | 5.00 | sulfathiazole can be prepared according to the teachings of Example 1 by using 24 grams of sulfathiazole in 450 cc. of water and reacting therewith 15 cc. of 12 N hydrochloric acid. This produces a solution containing about 1.7 percent of the hydrochloride of sulfathiazole.

Approximately one fluid ounce of the resulting solution is added to each gallon of water which is to be fed to the infected animals.

The solutions described in both examples can be kept safely for a reasonable time without spoiling or losing potency.

For most purposes it is found that the therapeutically correct minimum sulfa levels in the blood of poultry for combating infections is 4 milligrams of sulfa drug per 100 cc. of the blood of the poultry. Clinical tests show that from about 3 to about 10 milligrams of sulfa per hundred milliliters of blood provides a satisfactory level to combat the usual diseases of poultry. Although the sulfa drugs in insoluble form are well known as therapeutic agents, it is found that it is virtually impossible to attain satisfactory blood sulfa levels by incorporating them in the diet of the It is found that the sodium salts of certain sulfa drugs, even though water-soluble, are incapable of building up the required minimum blood levels of sulfa for effective control of disease, whereas the hydrochloride form of the same sulfa drugs will build up in the livestock blood levels of sulfa well above the required minimum without employing a large quantity of the drug. In fact, a concentration of from about 15 grains to about 32 grains of a hydrochloride of a sulfa drug per gallon of solution will induce a blood sulfa level of from about 3 to about 10 milligrams of the hydrochloride per 100 milliliters of blood.

Clinical tests show that the hydrochlorides of the present invention produce the desired blood levels much faster and therefore bring about quicker cures of a larger number of animals in a flock than is possible with the conventional method of treatment. By way of illustration, the following chart shows the results obtained in clinical tests of 100 4-week old mixed breeds of chickens obtained from a hatchery, the chickens being divided into four groups of 25 each and placed in identical coops under comparable conditions. In the table below the poultry in group I were used as a control.

Table I

| Group | Inoculation | Drinking Water Medication |
|---|---|---|
| I (Control) | None | None. |
| II | 50,000 sporulated oocysts on first and sixth days. | None. |
| III | do | One ounce hydrochloride of sulfaguanidine per gallon drinking water started at end of 1st day and continued through 5th day. |
| IV | do | One ounce hydrochloride of sulfaguanidine per gallon drinking water started on 6th day and continued for 5 days. |

Table II

| Days | I | | II, Inoculated | |
|---|---|---|---|---|
| | Stools | No. Dead | Stools | No. Dead |
| First | O. K. | 0 | O. K. | |
| Second | O. K. | 0 | O. K. | 0 |
| Third | O. K. | 0 | Some blood | 1 |
| Fourth | O. K. | 0 | Bloody | 0 |
| Fifth | O. K. | 0 | do | 2 |
| Sixth | O. K. | 0 | Some blood | 0 |
| Seventh | O. K. | 0 | Very bloody | 0 |
| Eighth | O. K. | 0 | Some blood | 0 |
| Ninth | O. K. | 0 | do | 1 |
| Tenth | O. K. | 0 | No blood | 0 |
| Eleventh | O. K. | 0 | do | 0 |

| | III, Inoculated | | IV, Inoculated | |
|---|---|---|---|---|
| | Stools | No. Dead | Stools | No. Dead |
| First | O. K. | 0 | O. K. | 0 |
| Second | O. K. | 0 | O. K. | 0 |
| Third | Some blood | 0 | Some blood | 1 |
| Fourth | Bloody | 0 | Bloody | 1 |
| Fifth | No blood | 0 | do | 0 |
| Sixth | do | 0 | do | 0 |
| Seventh | do | 0 | Some blood | 0 |
| Eighth | do | 0 | No blood | 0 |
| Ninth | do | 0 | do | 0 |
| Tenth | do | 0 | do | 0 |
| Eleventh | do | 0 | do | 0 |

The poultry in group II were deliberately infected but were not given any medication. The poultry in group III were deliberately infected as were those in group II, but 18 grains of the hydrochloride of sulfaguanidine was added to each gallon of drinking water fed to the poultry over a period of 5 days. The poultry in group IV were deliberately infected and fed drinking water medicated in the same concentration as that fed to the poultry in group III, but the feeding was not begun until the 6th day after infection and was continued for 5 days thereafter. It will be observed that none of the poultry in group III died during the entire course of the treatment and only two of the poultry in group IV died, but those died before administration of the agent was begun.

Various tests have been made to determine the blood sulfa levels attainable from various concentrations of the hydrochloride in the drinking water with poultry. A representative test shows that 15 grains of the hydrochloride of sulfaguanidine in each gallon of the drinking water produced a blood level of 4.86 milligrams per 100 milliliters of blood. Doubling the amount of the hydrochloride produced a blood level of 9.79 milligrams per hundred milliliters and tripling the amount of hydrochloride produced a level of 19.5 milligrams per hundred milliliters of blood. From the foregoing the optimum concentration of 18 grains of hydrochloride per gallon of drinking water was considered satisfactory, although field tests show 15 grains per gallon to be adequate.

In the treatment of S. pullorum in poultry it has been found that a mixture of 715 milligrams of the hydrochloride of sulfamethazine and 221 milligrams of the hydrochloride of sulfathiazole per gallon of drinking water provides a therapeutically satisfactory treatment when extended over a period of 5 days from the date of infection. Thus it will be appreciated that for other specific infections mixtures of 2 or more of the hydrochlorides of the sulfa drugs may be used advantageously.

In the treatment of baby chicks for the same disease a proportion of 11 grains of the hydrochloride of sulfamethazine to 4.1 grains of the hydrochloride of sulfathiazole built up very high sulfa blood levels very rapidly.

While it will be apparent to those skilled in the art that suitable modifications may be made in the examples set forth herein without departing from the scope of the invention, it is intended that the patent shall cover by suitable expression in the appended claim whatever features of patentable novelty reside in the invention.

I claim:

The method of preparing a non-toxic therapeutic composition for treatment of poultry to combat infectious coryza, pullorum, and the like bacterial infections in said poultry comprising dissolving in drinking water to be consumed by said poultry an acidic aqueous solution of a hydrochloride of a sulfa drug in a concentration sufficient to constitute from about 15 grains to about 32 grains of the hydrochloride of the sulfa drug in each gallon of said drinking water whereby a blood level of from about 3 milligrams to about 10 milligrams of the hydrochloride of the sulfa drug per 100 cubic centimeters of the blood is built up in the poultry consuming the drinking water thus prepared.

IRVING W. MARTIN.

REFERENCES CITED

The following references are of record in the file of this patent:

UNITED STATES PATENTS

| Number | Name | Date |
|---|---|---|
| 2,085,037 | Mietzach | June 29, 1937 |
| 2,230,875 | Winnek | Feb. 4, 1941 |
| 2,366,189 | Hiemenz | Jan. 2, 1945 |

FOREIGN PATENTS

| Number | Country | Date |
|---|---|---|
| 111,230 | Australia | Aug. 22, 1940 |

OTHER REFERENCES

U. S. Dispensatory, 23d ed. (1943), page 1157.

Lederle. Control of Poultry Diseases (Copyright 1943), pp. 16, 17.

Swales: Canadian Jour. of Research, December 1944, page 139.

Northey: Structure and Chemotherapeutic Activities of Sulfanilamide Derivatives, reprinted from Chem. Rev., vol. 27, August 1940, pp. 180, 189.

Manuf. Chem., August 1942, vol. 13, p. 186.

Nature, February 26, 1944, p. 253.

Horton-Smith: Veterinary Record, vol. 55, February 27, 1943, pp. 109, 110.